US012573316B2

(12) United States Patent
Roesch

(10) Patent No.: US 12,573,316 B2
(45) Date of Patent: Mar. 10, 2026

(54) EDUCATIONAL AID FOR TEACHING MATHEMATICS

(71) Applicant: Elizabeth Roesch, Keller, TX (US)

(72) Inventor: Elizabeth Roesch, Keller, TX (US)

(73) Assignee: EQUATE-ING IP HOLDCO, LLC, Keller, TX (US)

( * ) Notice: Subject to any disclaimer, the term of this patent is extended or adjusted under 35 U.S.C. 154(b) by 508 days.

(21) Appl. No.: 18/173,001

(22) Filed: Feb. 22, 2023

(65) Prior Publication Data

US 2024/0290219 A1 Aug. 29, 2024

(51) Int. Cl.

| | |
|---|---|
| ***G09B 23/02*** | (2006.01) |
| ***G09B 3/02*** | (2006.01) |
| ***G09B 19/02*** | (2006.01) |
| ***G09B 23/06*** | (2006.01) |
| ***G09B 23/24*** | (2006.01) |

(52) U.S. Cl.

CPC ............... *G09B 23/02* (2013.01); *G09B 3/02* (2013.01); *G09B 19/02* (2013.01); *G09B 23/06* (2013.01); *G09B 23/24* (2013.01)

(58) Field of Classification Search

CPC ........ G09B 23/02; G09B 23/06; G09B 23/24; G09B 19/02; G09B 3/02

See application file for complete search history.

(56) References Cited

U.S. PATENT DOCUMENTS 3,000,114 A * 9/1961 Orlov .................... G09B 23/10 434/194
3,311,997 A 4/1967 Denny
3,486,244 A * 12/1969 Horn ...................... G09B 23/04 434/194
3,742,619 A * 7/1973 Jenks ..................... G09B 23/02 177/264
4,713,009 A * 12/1987 Borenson ............... G09B 23/02 434/188

(Continued)

FOREIGN PATENT DOCUMENTS

CN 206301515 U 7/2017
DE 2823273 A1 11/1979
EP 0240574 A1 10/1987

*Primary Examiner* — Eddy Saint-Vil

(74) *Attorney, Agent, or Firm* — Perkins Coie LLP

(57) ABSTRACT

A balance, having an indicator with clearly marked inequalities, provides feedback to a user where the user determines whether they have created an equality or inequality and whether an adjustment is necessary. Users connect mathematical statements with a correct equality or inequality symbol. The indicator provides users with a physical representation of basic math operations, including addition, subtraction, multiplication, and division, as well as fractions, negative numbers, and algebraic equations. Physical adjustments to the balance system correspond to conventional mathematic/algebraic written representation. Constant cubes include several different sets of unit weight. Other cubes or objects are labeled with colored symbols and are provided in a variety of weights and quantities. Opposite chips are labeled with negative signs; line chips are labeled with "x" and "y." Combinations of the constant cubes, cubes or objects labeled with colored symbols, opposite chips, and line chips are arranged on removable pans on the balance to teach mathematical functions.

17 Claims, 14 Drawing Sheets

10

(56) References Cited

U.S. PATENT DOCUMENTS

| | | | | |
|---|---|---|---|---|
| 5,927,989 | A * | 7/1999 | Kung | G01G 1/22 434/194 |
| 5,951,406 | A * | 9/1999 | Steane | A63G 11/00 472/111 |
| 6,200,140 | B1 | 3/2001 | Steane | |
| 2019/0318657 | A1 | 10/2019 | Koberstine et al. | |

* cited by examiner

80

20

80

80

100

EDUCATIONAL AID FOR TEACHING MATHEMATICS

FIELD

Various of the disclosed embodiments concern an educational aid for teaching mathematics.

BACKGROUND

A Roberval balance is a weighing scale presented to the French Academy of Sciences by the French mathematician Gilles Personne de Roberval in 1669.

In this scale, two identical horizontal beams are attached, one directly above the other, to a vertical column, which is attached to a stable base. On each side, both horizontal beams are attached to a vertical beam. The six attachment points are pivots. Two horizontal plates, suitable for placing objects to be weighed, are fixed to the top of the two vertical beams. An arrow on the lower horizontal beam (and perpendicular to it) and a mark on the vertical column may be added to aid in leveling the scale.

The object to be weighed is placed on one plate, and calibrated masses are added to and subtracted from the other plate until level is reached. The mass of the object is equal to the mass of the calibrated masses regardless of where on the plates the items are placed. Because the vertical beams are always vertical, and the weighing platforms always horizontal, the potential energy lost by a weight as its platform goes down a certain distance is always the same. It makes no difference where the weight is placed.

For maximum accuracy, Roberval balances require that their top fulcrum be placed on the line between the left and right pivot so that tipping does not result in the net transfer of weight to either the left or right side of the scale: a fulcrum placed below the ideal pivot point tends to cause a net shift in the direction of any downward-moving vertical column (in a kind of positive feedback loop); likewise, a fulcrum placed above this point tends to level out the arms of the balance rather than respond to small changes in weight (in a negative feedback loop).

An off-center weight on the plate exerts a downward force and a torque on the vertical column supporting the plate. The downward force is carried by the bearing at the top beam in most balance scales, the lower beam being supported horizontally at midpoint by the body of the scales by a simple peg-in-slot arrangement, so it effectively hangs beneath the top beam and stops the platforms from rotating. The torque on the column is taken by a pair of equal and opposite forces in the horizontal beams. If the offset weight sits toward the outside of the platform, further from the center of the scales, the top beam is in tension and the bottom beam is in compression. These tensions and compressions are carried by horizontal reactions from the central supports; the other side of the scales is not affected at all, nor is the balance of the scales.

The use of Roberval balance as a mathematic teaching aid is known. See U.S. Pat. No. 6,200,140 in which two balance-beams, and a means for constraining the two beams interact. The two beams are arranged one to represent positive numbers, and the other to represent negative numbers. The in-balance condition of the beams serves to indicate equality, as in a conventional math-balance.

Such known approaches to the use of a Roberval balance to teach mathematic concepts are limited to simple mathematic functions. Further, such approaches are neither simple to set up nor intuitive to operate.

SUMMARY

An educational apparatus includes a Roberval-style balance having an indicator for providing feedback to a user, with which the user determines whether they have created an equality or inequality and whether an adjustment is needed. The indicator comprises a pointer having clearly marked inequalities. Users connect mathematical statements easily and accurately with a correct inequality symbol, and the indicator provides users with a physical representation of basic math operations, including addition, subtraction, multiplication, and division, as well as fractions, negative numbers, and algebraic equations.

Constant cubes (CC's) include several different sets of unit weight. Other cubes or objects are labeled with colored symbols and are provided in a variety of weights and quantities. Opposite chips, small cards labeled with negative signs and of negligible mass so they do not disrupt the balance, are also provided. Line chips, small cards of negligible mass labeled with "x" and "y," are provided to allow users to explore linear and simple quadratic relationships.

Combinations of the constant cubes, cubes or objects labeled with colored symbols, opposite chips, and line chips are arranged on removable pans on the balance to teach mathematical functions.

DETAILED DESCRIPTION

Balance Set

Figure 1A:
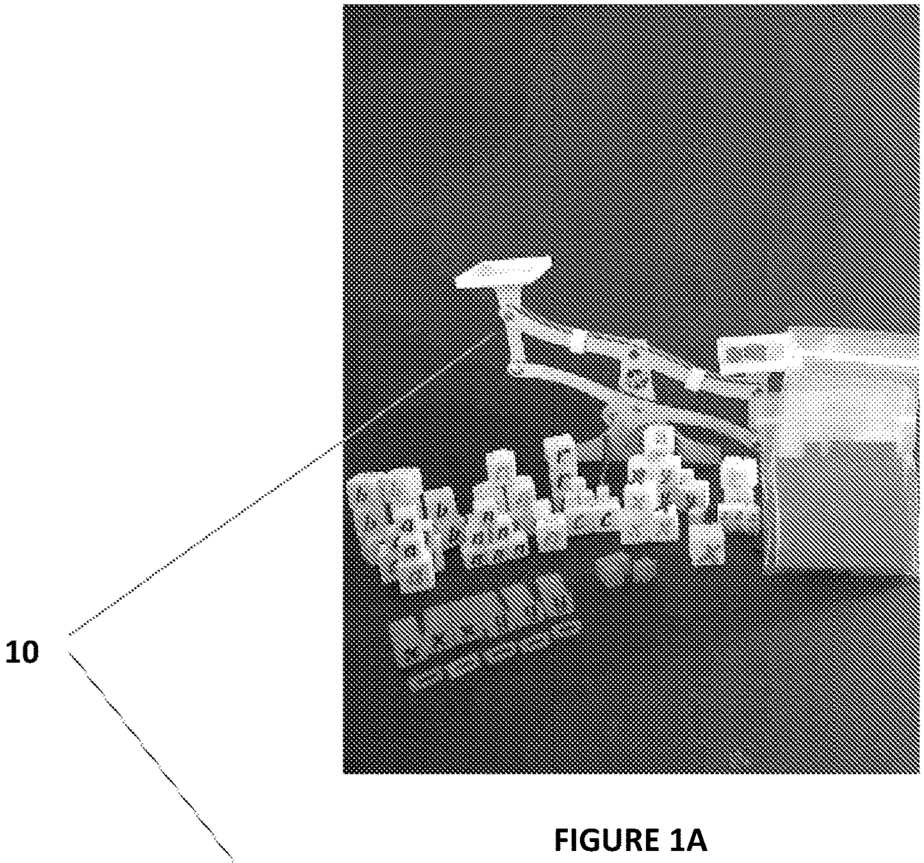
FIGS. 1A and 1B show an educational aid for teaching mathematics showing balance elements according to the invention.
Figure 1B:
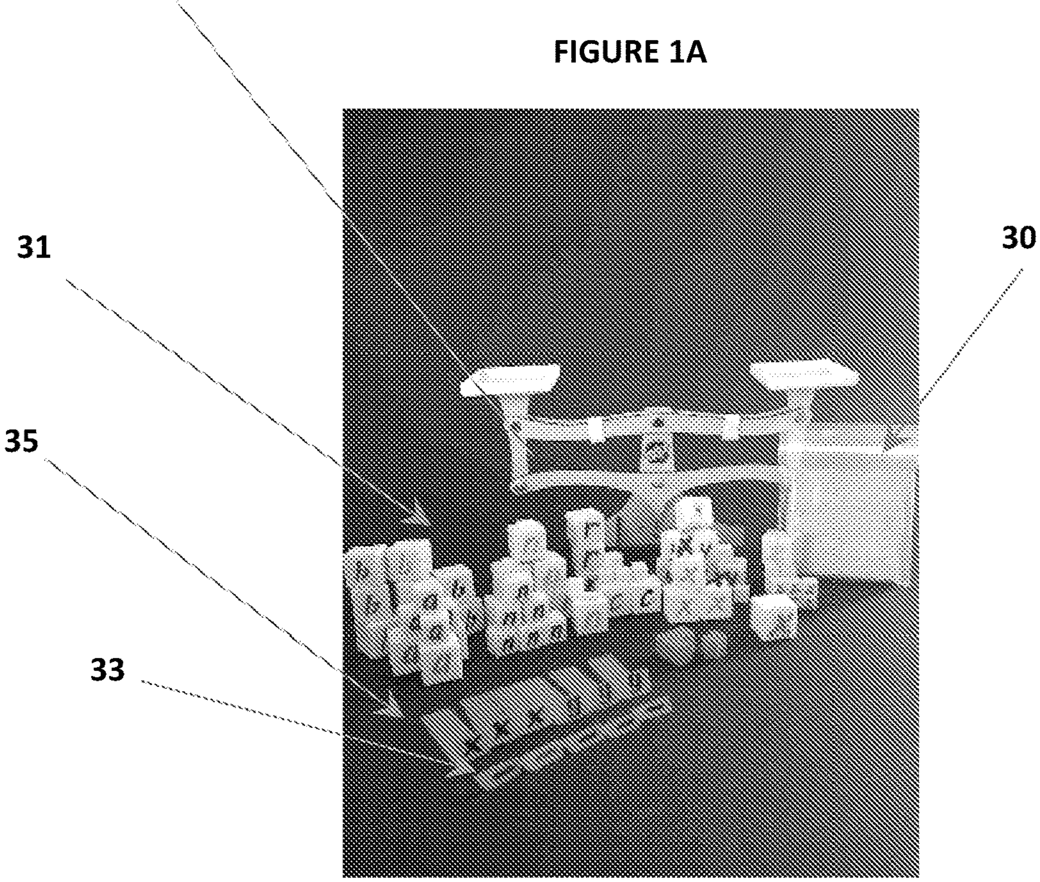

FIGS. 1A and 1B show an educational aid for teaching mathematics showing balance elements according to the invention. Components included in an embodiment of the invention include:

A balance 10;

A set of constant cubes, or CCs 30, each with a mass of 1 unit;

Cubes or objects 31, labeled with colored symbols, in a variety of weights and quantities;

Opposite chips 33, i.e. small cards labeled with negative signs and of negligible mass so they do not disrupt the balance; and Line chips 35, i.e. small cards of negligible mass labeled with "x" and "y" to allow users to explore linear and simple quadratic relationships.

Special components of the set include:

½ fractional pieces, which can be taken apart and reassembled;

⅓ fractional pieces;

¼ fractional pieces;

"−1" (Minus 1) pieces with removable CC, or constant cube, and "−1" indicator in bottom of well; and Variable-naught pieces which are thin, ultralight colored letters which have minimal mass so as to not deflect the balance indicator even when several are added to one side together and therefore can simulate a variable which equals zero.

In embodiments of the invention a fraction set includes:

Multiple squares of uniform area and mass sliced into a variety of fractional pieces;

Users are able to explore concepts of adding and subtracting fractions with like and unlike denominators;

Users can create equivalent fractions to practice renaming and reducing fractions for convenient computations and then test their results on the balance, using feedback from the indicator to verify results or realize a need for correction or recalculation;

Users can predict a sum of fractions and test the result on the balance, using the indicator to verify their results; and Users can explore fractional inequalities using the balance indicator to verify results.

Constant cubes comprise several different sets of unit weight that allow for increased flexibility and complexity. For example, a normal set of 1-cc, 1-g CC's allow for fundamental practice of solving mathematical statements involving variables. An additional set of 0.2-g (or other weight) CC's allows for solving of variables which have fractional values such as 1.6.

This set also includes cubes with numbers, instead of letters or shapes, to indicate the correct mass which allow users to check solutions kinesthetically and to explore the concept of substitution because they replace the identified variable with the number cube.

Balance

Figure 2A:
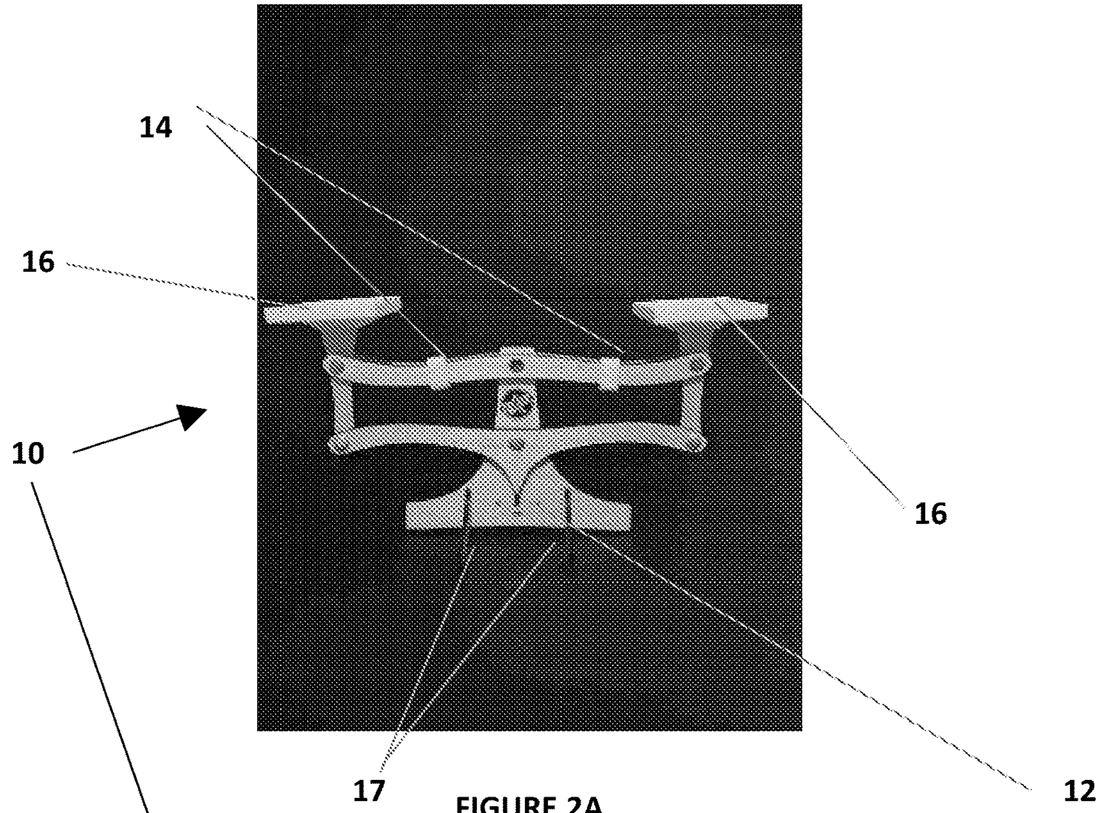
FIGS. 2A and 2B provide front (FIG. 2A) and rear (FIG. 2B) views of an educational aid for teaching mathematics according to an embodiment of the invention.
Figure 2B:
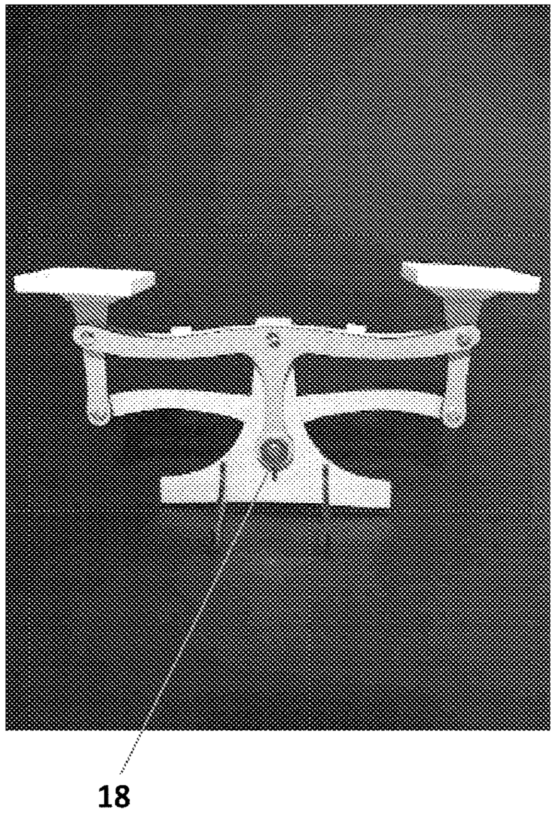

FIGS. 2A and 2B provide front (FIG. 2A) and rear (FIG. 2B) views of an educational aid for teaching mathematics according to an embodiment of the invention. Embodiments of the invention comprise a balance 10 that includes an indicator 12 which provides feedback to the user, allowing them to determine whether they have created an equality or inequality and whether an adjustment is needed. Sliding adjusters 14 zero the balance on an uneven surface or when masses in a provided equation are slightly unequal.

Removable pans 16 and feet 17 are provided for efficient storage. A rear counterweight 18 is suspended well below top balance arm as a counterbalance offset to increase responsiveness and accuracy of this Roberval-style device and to return the arm to neutral position when weights are removed.

Indicators on Balance

Some balances use the position of pinions to indicate whether the balance is in a "less than" or "greater than" position. However, the position of the double or horizontal beams indicates the opposite inequality symbol, which can be quite confusing for the user. Additionally, the pinions are not the easiest or most obvious connections to the mathematics being performed. Embodiments of the invention provide a pointer with clearly marked inequalities that allow users to connect the mathematical statement easily and accurately with the correct inequality symbol. As explained in greater detail below, the novel balance disclosed herein allows a user to see a physical representation of the basic math operations, including addition, subtraction, multiplication, and division, as well as fractions, negative numbers, and algebraic equations.

Addition

Figures 3A, 3B, 3C:
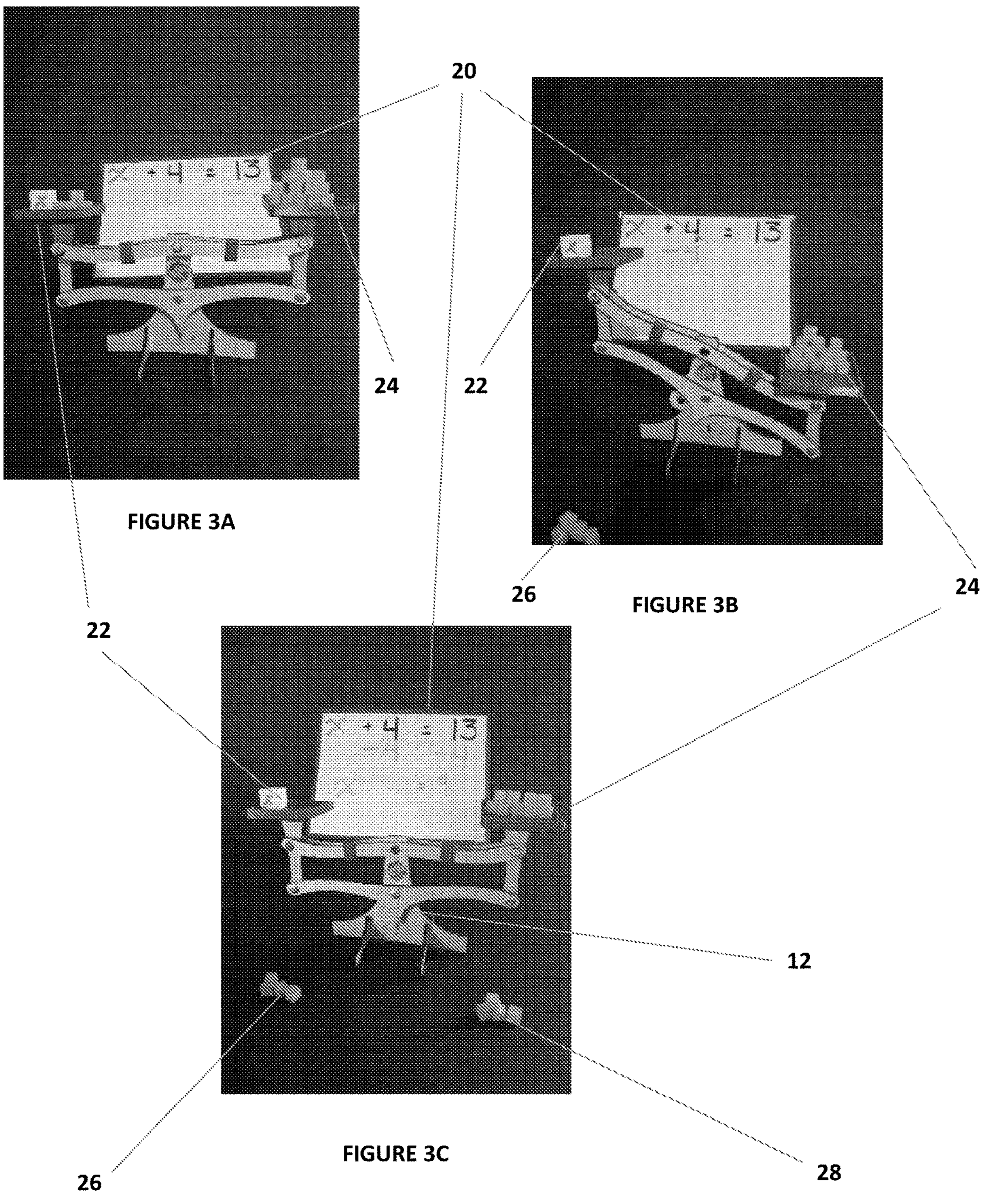
FIGS. 3A-3C show an educational aid for teaching mathematics, in particular an addition function according to the invention.
Figure 4A:
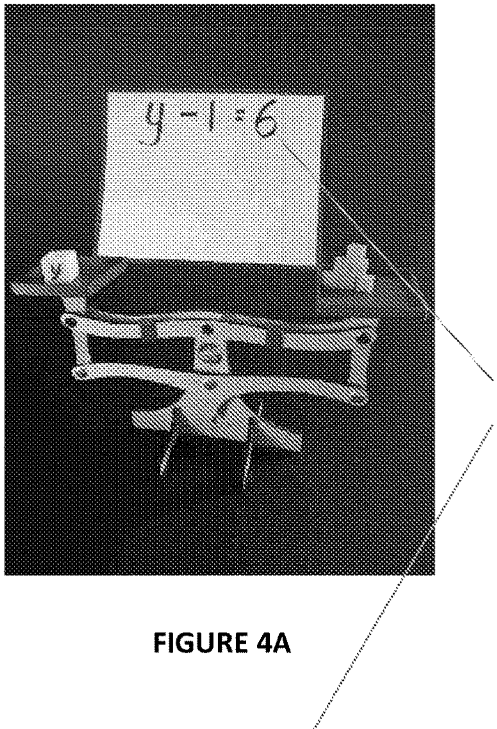
FIGS. 4A-4D show an educational aid for teaching mathematics, in particular a subtraction function according to the invention.
Figure 4B:
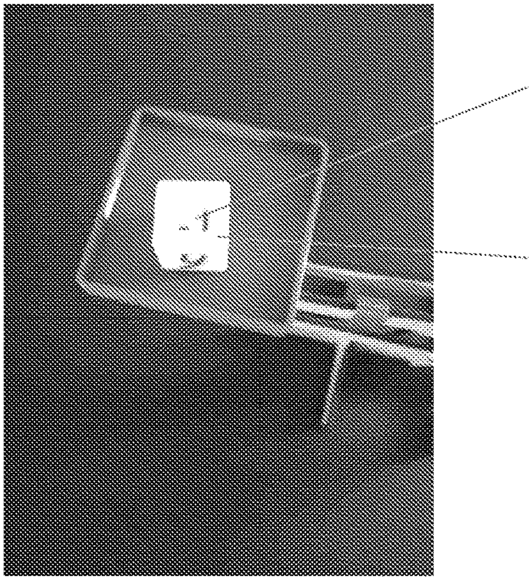
Figure 4C:
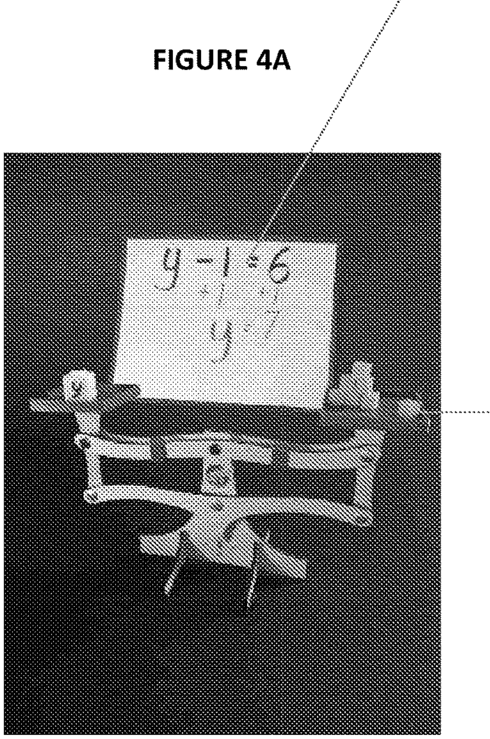
Figure 4D:
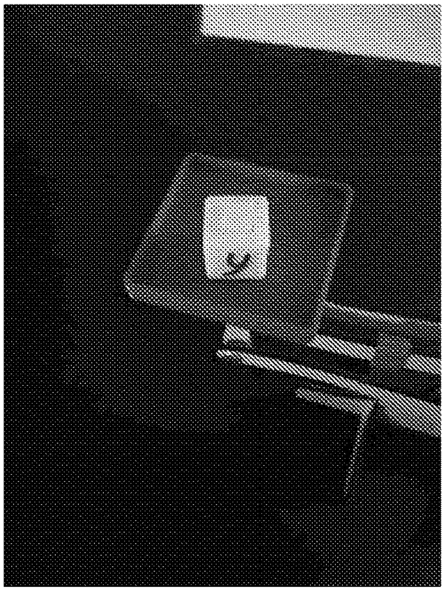

FIGS. 3A-3C show an educational aid for teaching mathematics, in particular an addition function according to the invention.

Basic operation of an embodiment of the invention involving addition is as follows:

Questions, in the form of algebraic equations and inequalities, are provided in a workbook 20;

An embodiment includes weighted, color-coded letter cubes corresponding to mathematical operators that compose the questions posed in the workbook;

The user places all items on the left side of the equation 22 onto the left pan, and all items on the right side of the equation 24 on the right pan;

The user checks for balance by making sure the balance indicator 12 points to the equal sign, and adjusts the reading as necessary to compensate, for example, for the balance resting on an uneven surface, by moving the sliders as needed;

The user performs subtraction to remove any addend 26 from the variable quantity and notes that the balance is uneven (FIG. 3B);

The user then intuitively uses subtraction to remove an identical quantity 28 from the side opposite the variable to create a balanced equation (FIG. 3C); and The user can identify the value of the unknown variable by counting the CC's, or constant cubes 24, each with a mass of one unit.

Subtraction

FIGS. 4A-4D show an educational aid for teaching mathematics, in particular a subtraction function according to the invention.

Basic operation of an embodiment of the invention to assist in solving equations involving subtraction is as follows:

Select variable cubes include a removable constant cube 30, or CC;

When removed (FIG. 4B), the user can simulate "variable minus 1," and can see an indicator 32 inside the hollowed-out cube which verifies that a unit has been removed and must be replaced through addition to obtain a complete variable;

Completing the variable by adding a unit cube or CC causes the balance to indicate an inequality, which prompts the user to perform an identical addition 34 to the opposite side of the balance (FIG. 4C); and This creates a balanced equation, and the user has solved the equation for the variable and can identify its value.

Other double beam balances and multiple-pan balances have a method for demonstrating negative values which is not intuitive or easily understood by the user. Embodiments of the invention include "−1," "−2," "−3," and "−4" components to provide a fun and intuitive way to visualize subtraction and negative values in the context of mathematical statements.

Variable Cubes

Figure 5A:
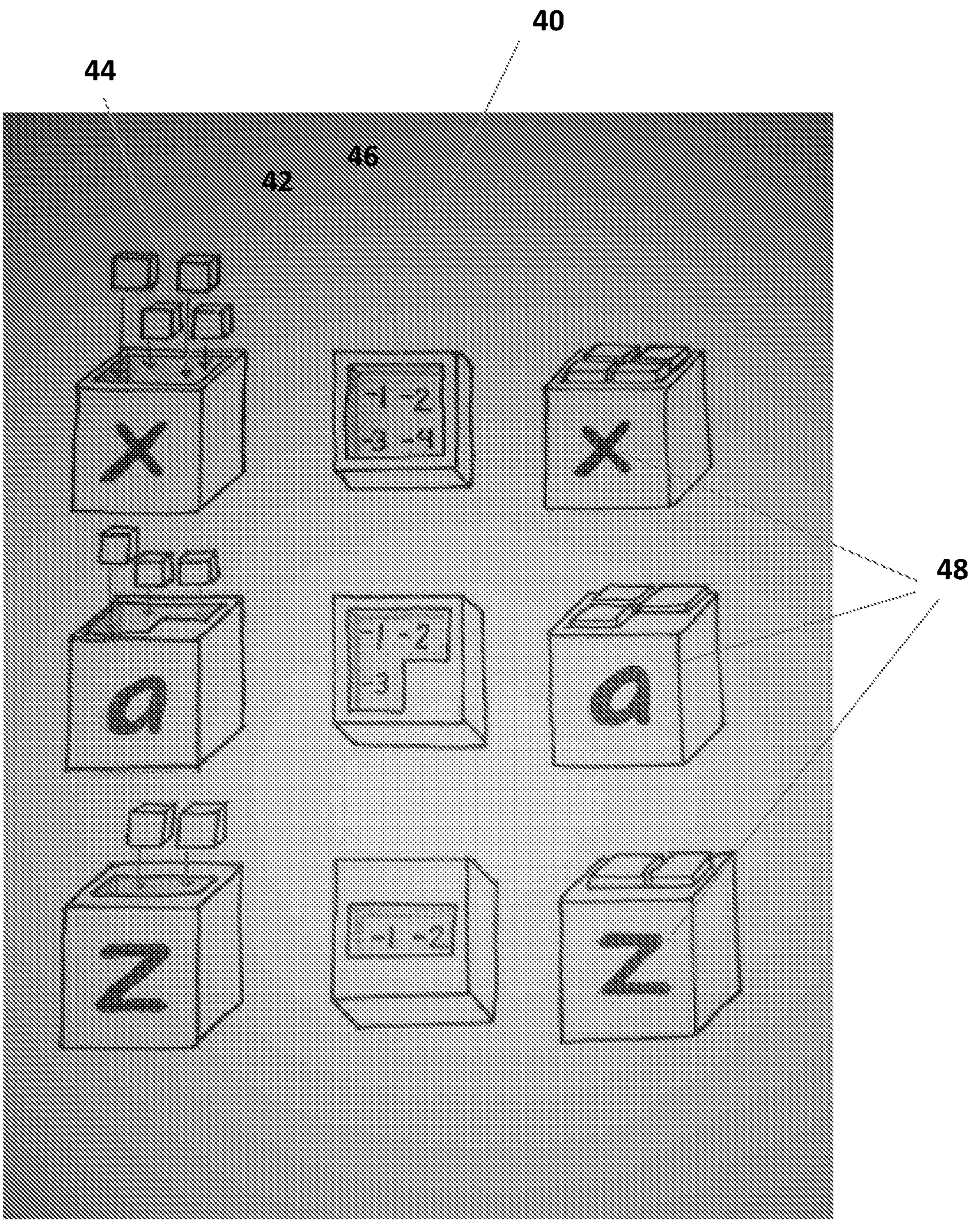
FIGS. 5A and 5B show various variable cubes according to an embodiment of the invention.
Figure 5B:
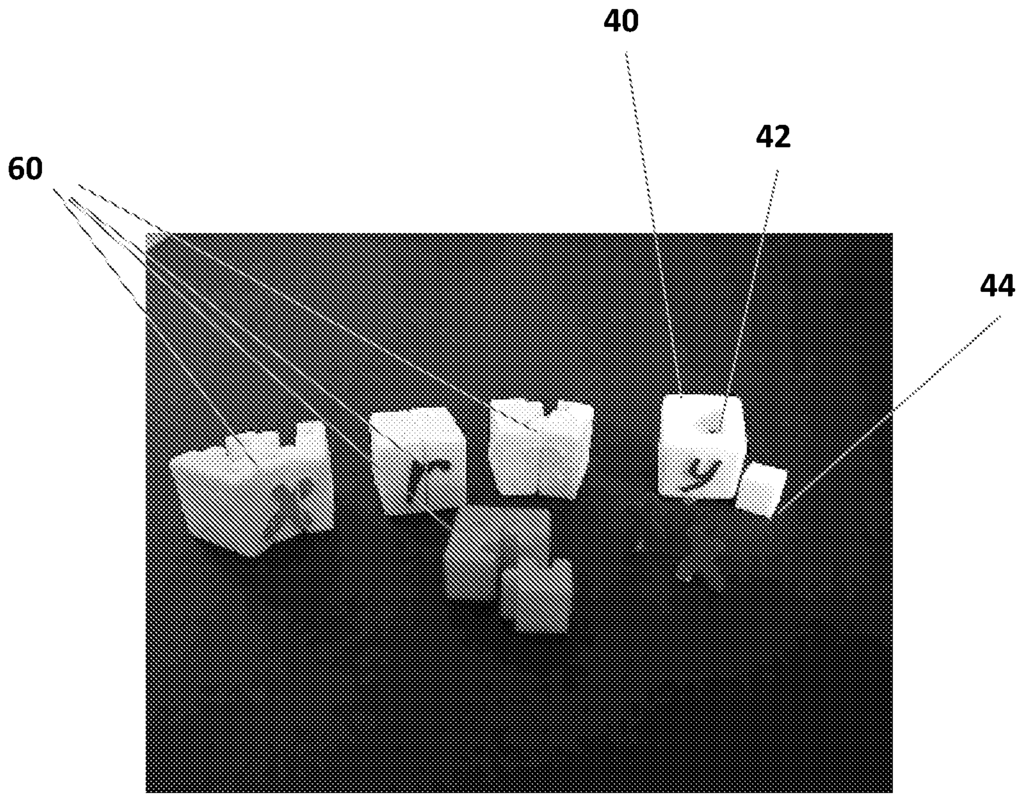

FIGS. 5A and 5B show various variable cubes according to an embodiment of the invention.

The minus variable cube 40 (FIG. 5A) is identical to its counterpart cube because it has the same weight, same variable/symbol, and same color. However, it is constructed with a well 42 which holds a number of unit weights 44 which can be removed. Because the unit weights cover the "−1" or other negative values, its appearance indicates that it is a complete variable. The user can remove one or more unit weights to carry out the mathematical operation of subtracting one or more units from the variable. When they do so, the "1," "−2," etc. notations 46 are revealed in the bottom of the well. This allows the user to place a variable on the balance pan and then perform "−1" by removing a 1-unit weight cube, 1 CC from the top of the variable. Once the entire mathematical statement is demonstrated on the balance, such as "y−1" on the left side and "6" on the right side (see FIGS. 4A-4D), the user can then intuitively see that one CC must be added to the left side to obtain a whole x variable. The balance then indicates an inequality, so the user is prompted to duplicate the action of adding 1 CC to the right side of the balance to see that the value of the x variable in this case is 7. Variables are designated with an indicia 48, e.g. x, a, z.

Embodiments of the invention include minus variables that allow the student to subtract up to four or more units from a single variable, providing additional complexity and challenge, along with the intuitive action of removing weight units to simulate the subtraction operation. By representing the mathematical operation of subtraction via the physical characteristics of the cube itself rather than with the mechanics of the balance, users are able to draw a much clearer connection between the actual physical actions performed on the balance and the corresponding mathematical operations on the equation itself. This is because users emulate subtraction by actually subtracting values from the variable rather than adding values to a specific negative portion of the balance, which can lead to confusion due to the added complexity.

Fractional cubes 60 (FIG. 5B) for several variables can be divided into halves, thirds, and fourths by sliding apart.

Multiplication

Figure 6A:
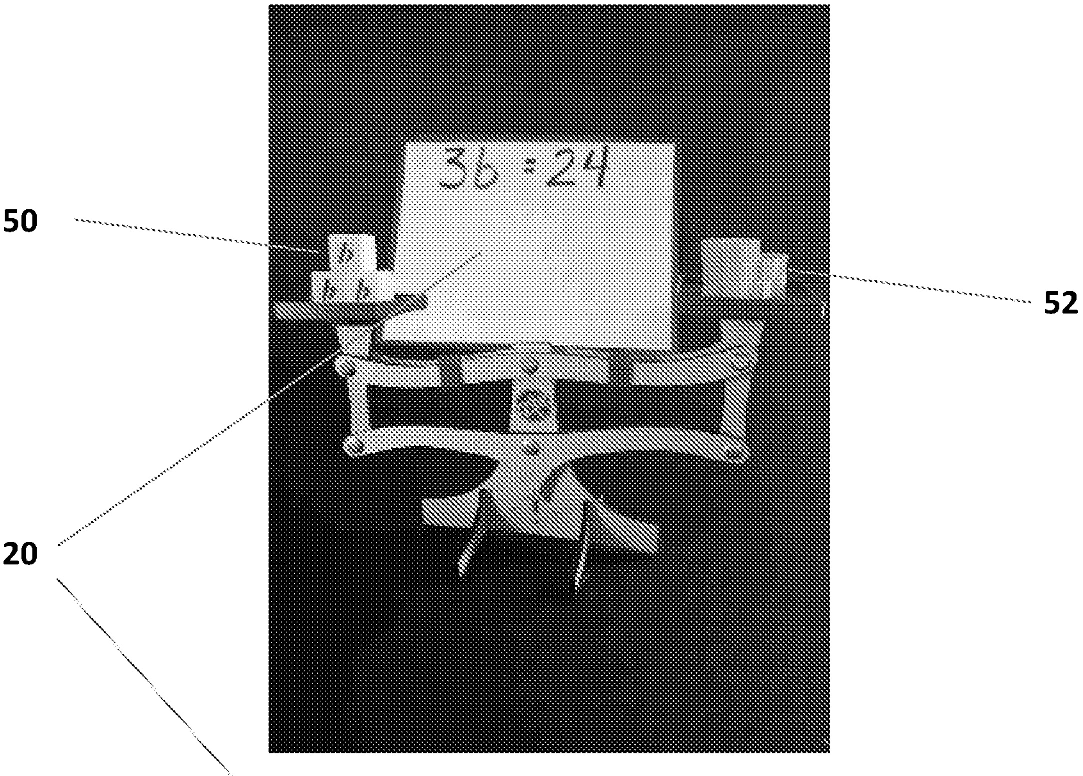
FIGS. 6A and 6B show an educational aid for teaching mathematics showing a multiplication function according to the invention.
Figure 6B:
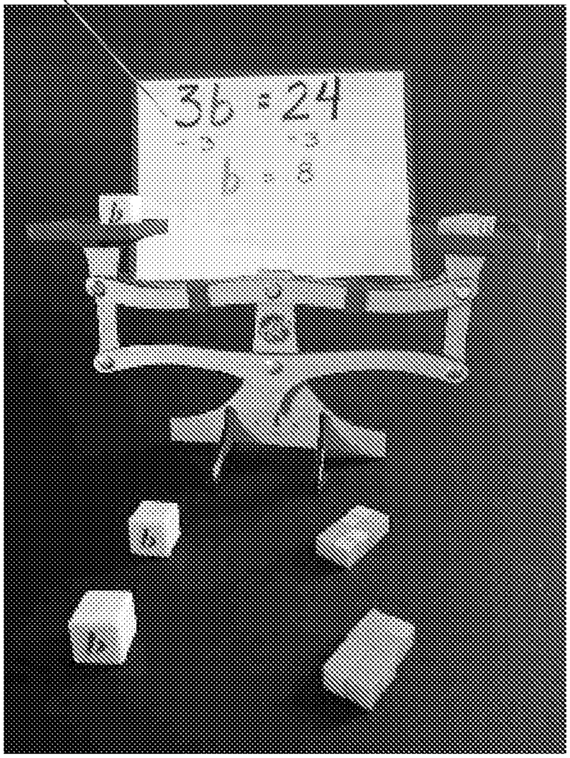

FIGS. 6A and 6B show an educational aid for teaching mathematics showing a multiplication function according to the invention.

Basic operation of an embodiment of the invention to assist in solving equations and inequalities involving multiplication is as follows:

Included in the set are multiples of several different variables so that users can solve questions involving multiplication;

The user places the correct number of the color-coded variable 50 on one side of the balance (FIG. 6A);

The user completes the equations using the correct number of CCs, or unit cubes 52, on the other side;

The user is then able to see the strategic advantage of dividing the variables into smaller groups (FIG. 6B);

The user can then see the relationship between similarly divided groups of CCs to match with the groups of variables; and This allows the user to identify the value of the variable and to check their answer for consistency and accuracy.

Fractions

Figure 7A:
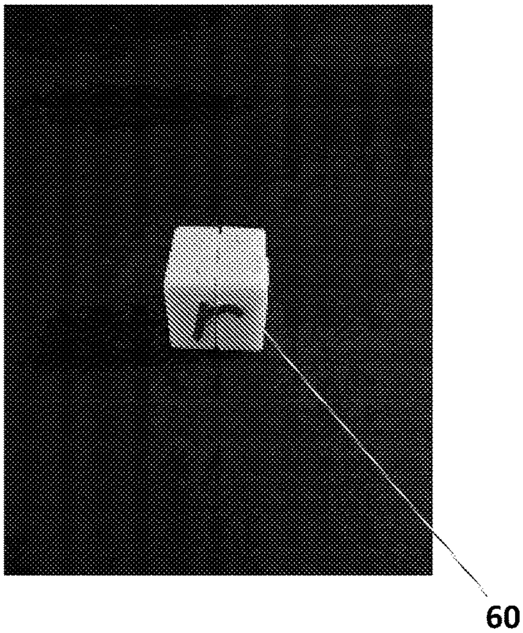
FIGS. 7A-7C show an educational aid for teaching mathematics showing the use of fractions according to the invention.
Figure 7B:
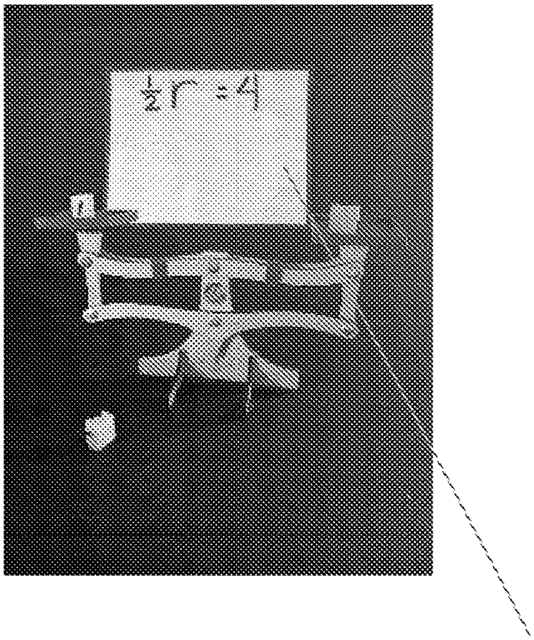
Figure 7C:
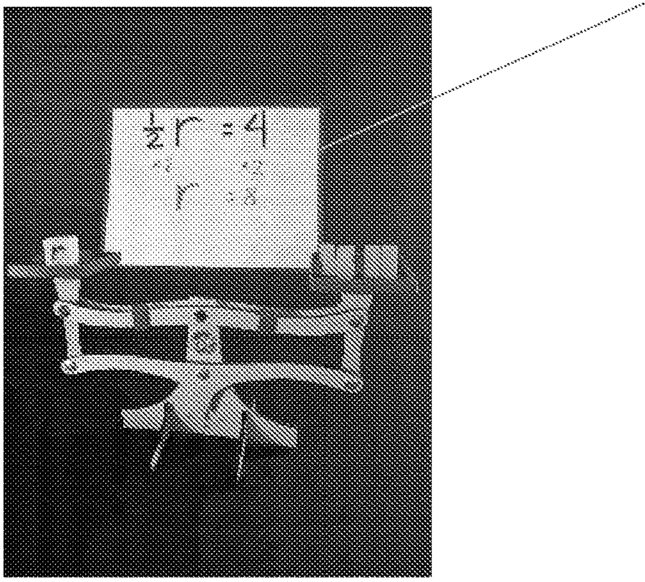

FIGS. 7A-7C show an educational aid for teaching mathematics showing the use of fractions according to the invention. Basic operation of an embodiment of the invention to assist in solving equations and inequalities involving fractions in such functions as division is as follows:

Included in the set are fractional cubes 60 for several variables which can be divided into halves, thirds, and fourths by sliding apart (FIG. 7A);

These fractional variables allow users to solve questions involving division or multiplication by a fraction;

Users can intuitively see that they can reach a solution by multiplying the fraction to reach a whole number (FIG. 7B); and Feedback from the balance indicates that the user must perform identical multiplication on the side opposite the variable to determine the solution (FIG. 7B).

Figures 8A, 8B, 8C:
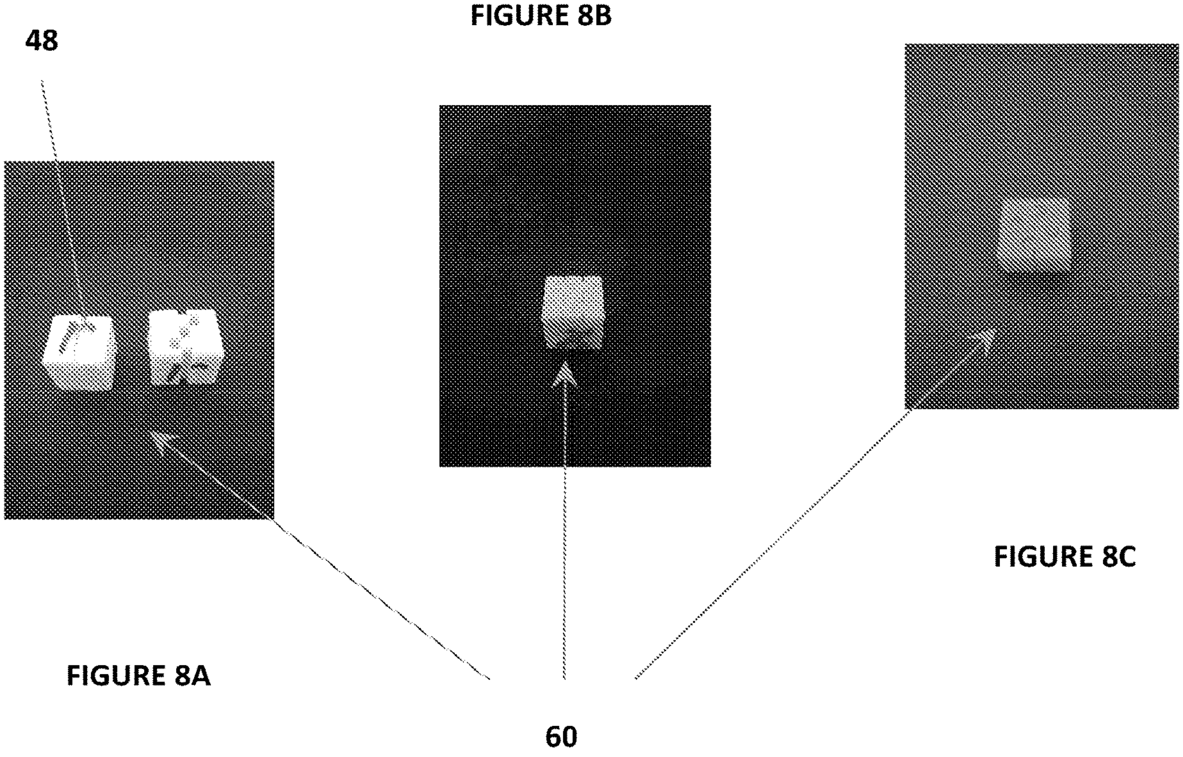
FIGS. 8A-8C show cubes for use as fractional variables according to the invention.

FIGS. 8A-8C show fractional cubes 60 for use as fractional variables according to the invention. The cubes can be marked with a variable 48, such as r (FIG. 8A) or x (FIG. 8B).

Some math balance sets may have incremental weights marked with fractional quantities. While the values make sense to the creator of the set, they do not necessarily make sense to the user of the device.

Embodiments of the Invention

Include fractional pieces which interlock and are detachable (FIGS. 8A-8C);

Are intuitive for the user to be able to detach halves into two pieces, thirds into three pieces, fourths into four pieces, etc.;

Fractional pieces are clearly marked with a colored letter or symbol (FIGS. 8A and 8B) so that the detached pieces are visually logical as pieces that go together to make a whole;

allow users to work with division by integers, such as x/2 or ⅓(z). The user can intuitively see that they need one or two more pieces to complete the whole. When they multiply the variable side by the appropriate quantity to get a whole, they multiply the constant side by the same quantity to keep the balance in the equal position, and so are able to find the value of the unknown variable;

Allow users to work with multiplication of fractions, such as ⅔(b). For this function, the user can multiply both sides of the equation or inequality (math statement) by 3 to get 2 whole variables. The user can then divide both sides of the math statement, as represented on the two pans, into two equal parts, removing one part from each side to reveal the value of the unknown variable; and Fractional quantities of variables are represented with whole variable cubes which can be physically separated into halves, thirds, or fourths by detaching the appropriate parts of the cube. Other balances represent fractional quantities with whole weights/cubes that are solely marked with the fractional quantities, e.g. x/2, which cannot be broken apart and therefore encourage the user to see x/2 as its own distinct variable rather than a proportion of x itself. In embodiments of the invention representation of fractional quantities through physical division of whole variables helps the user to understand that a fractional quantity of x is not a whole variable in itself but is only a piece of another variable.

Negative Numbers

Figure 9A:
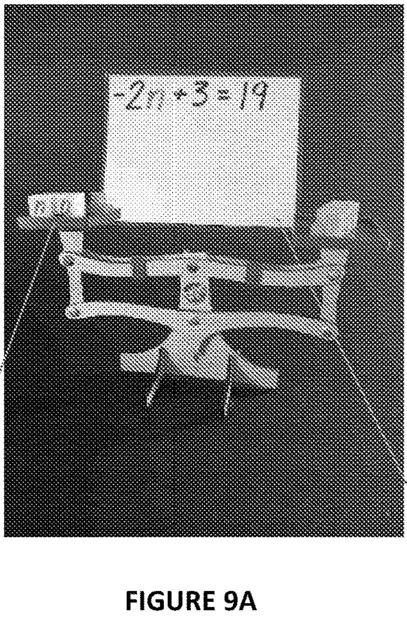
FIGS. 9A-9D show an educational aid for teaching mathematics showing the use of a negative number function according to the invention.
Figure 9B:
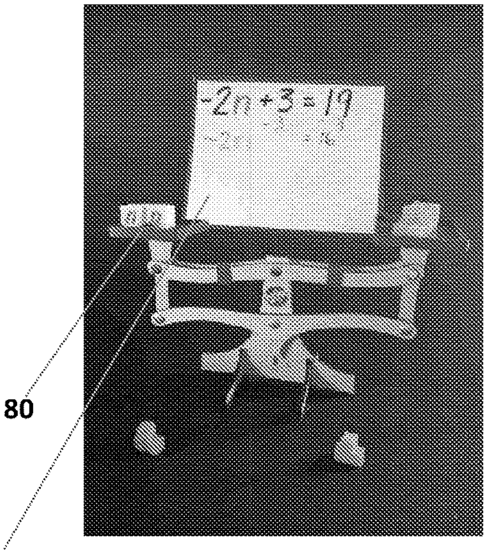
Figure 9C:
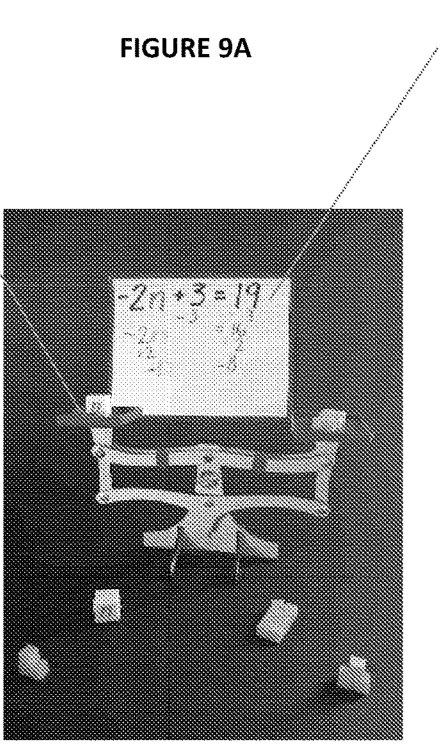
Figure 9D:
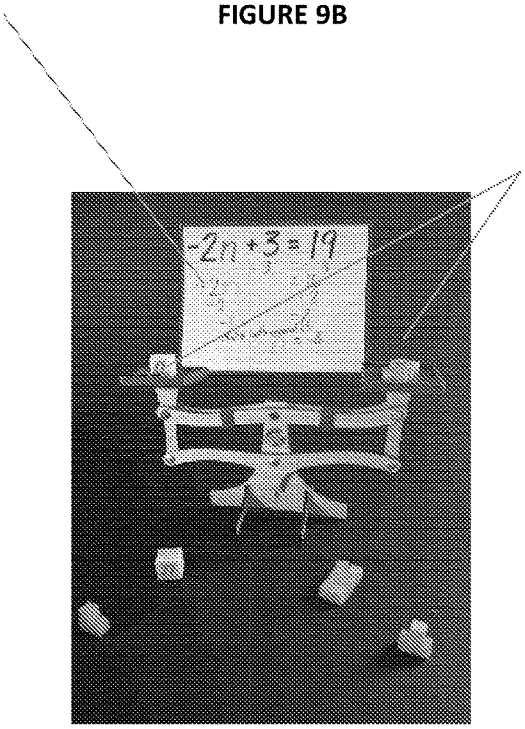

FIGS. 9A-9D show an educational aid for teaching mathematics showing the use of a negative number function according to the invention. Basic operation of an embodiment of the invention to assist in solving questions involving multiple steps as well as negatives is as follows:

- Real-world visualization of a multi-step equation allows user to strategize and pursue an efficient order of operations to identify the value of the variable;
- Negative signs are provided in the form of opposite chips 80, lightweight tabs imprinted with negative signs;
- In the example question shown in FIGS. 9A-9D, a user likely identifies removing 3 from each side as a logical and efficient first step (FIG. 9B). The user then divides both sides by 2 (FIG. 9C). Finally, the user takes the opposite of both sides (FIG. 9D), adding one opposite chip to each side, which allows the user to visualize the concept that two opposites counteract each other and can then be removed from the variable side of the question.

Opposite Cards

Opposite cards are lightweight cards that are imprinted with a negative sign to denote the "opposite." They allow the user to visualize the values of variables which have a negative value. They also allow user to visualize taking the opposite, or additive inverse, of both sides of a mathematical statement. In this way users see the connection of the opposite concept to written algebraic techniques and standards.

For a mathematical statement such as "−b+5=12," the user places an opposite card under a b variable and 5 CCs on the left side of the balance and places 12 CCs on the right side of the balance. The user can then remove 5 CCs from each side to get −b=7, to be read as "the opposite of b is 7." The user then can apply additional opposite cards to both sides, which results in a positive b and −7, to be read as "b is the opposite of 7," or b=−7.

X and Y Cards

Figure 10A:
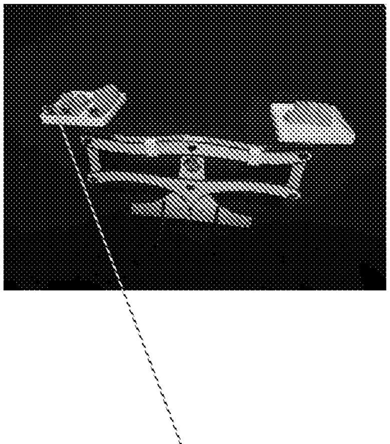
FIGS. 10A-10C show a balance on which lightweight cards that are imprinted with a symbol denote variables such as x and y according to the invention.
Figure 10B:
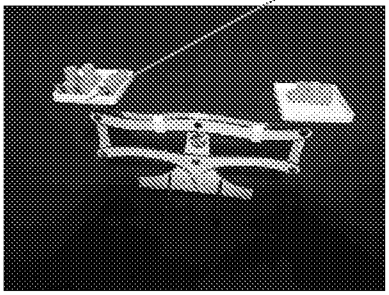
Figure 10C:
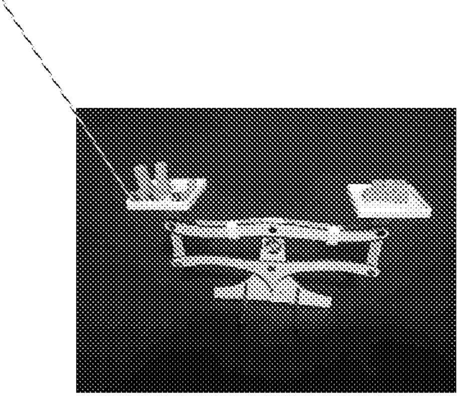

FIGS. 10A-10C show a balance according to the invention on which lightweight cards 100 that are imprinted with a symbol denote variables such as x and y. They allow the user to visualize variables having a value expressed by associated CC's.

Naught Variables

Naught variables are created with weight that is under the sensitivity threshold of the balance. They allow the user to conceptualize a variable that has a value of zero and are used with the balance in a comparable way to other variables.

Symbol Cubes

Figure 11:
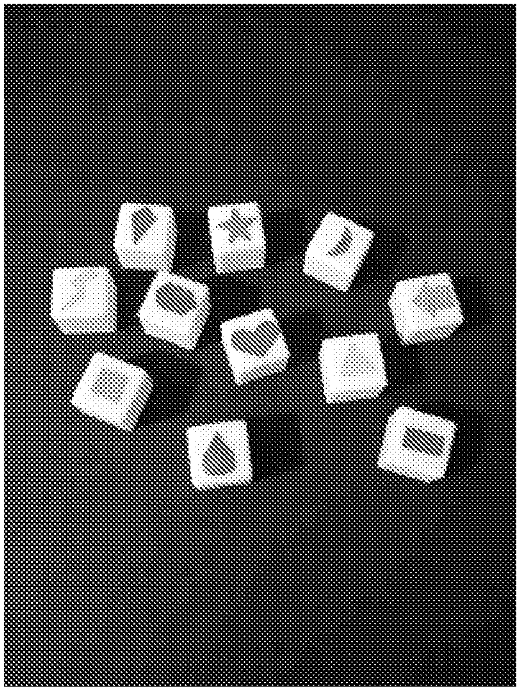
FIG. 11 show a cube set featuring shapes instead of letters according to the invention.

FIG. 11 show a cube set according to the invention featuring shapes instead of letters which is easy, inviting, and intuitive for younger users or those with learning differences.

Chemistry Applications

Figure 12:
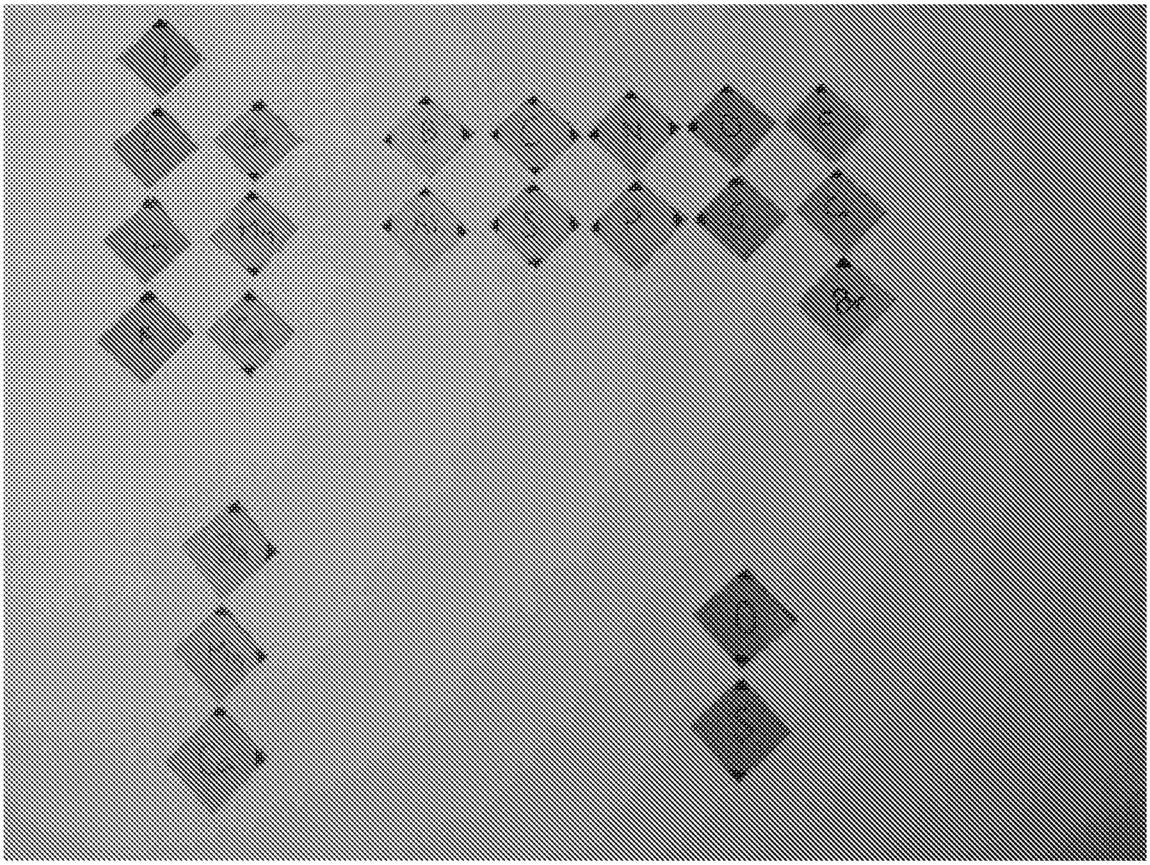
FIG. 12 shows a chemical formula balance according to the invention.

FIG. 12 shows a chemical formula balance according to the invention. In FIG. 12:

- Pieces include chemical symbol and magnetic, snap-and-lock, hook-and-loop, or similar attachment points corresponding to the element's most common number of chemical bonds (1 for hydrogen and lithium, 2 for beryllium, 3 for boron, 4 for carbon, 3 for nitrogen, 2 for oxygen, etc.);
- Pieces for the various elements have masses, and are marked accordingly, which are proportional to their average atomic masses to demonstrate the reality of increasing atomic mass for atoms of increasing atomic number and permit exploration of basic stoichiometry;
- Pieces corresponding to elements in each period are sized incrementally to show user the increase in atomic radius as they move down the periodic table;
- Users create compounds to demonstrate a variety of chemical reactions (see FIGS. 13A and 13 B);
- Users can then intuit the relationship between subscripts and number of atoms present as well as coefficients and number of molecules/formula units present;
- Users can then readily see the concept of unbalanced chemical equations and take steps to balance the equation they have created by making sure the same number of atoms of each element are present on both sides of the balance;
- The balance "=" indicator helps users verify that an equation is balanced; and
- A special set of additional pieces allow the user to visualize the basics of stoichiometry:
  - Mole holes are lightweight cups into which the pieces of a compound can be placed to conceptualize molar mass;
  - Colored mole holes include colors that allow users to differentiate between individual reactants and products and readily see the number of moles of each substance present in the balanced equation; and
  - Multiplier place cards are provided. Once the appropriate multiplier for the known mass is determined from the relationship between this given mass and the molar mass of the substance, the card is placed in easy sight or on the center of the balance so that user can conceptualize this multiplier being applied to every substance in the equation.

Figure 13A:
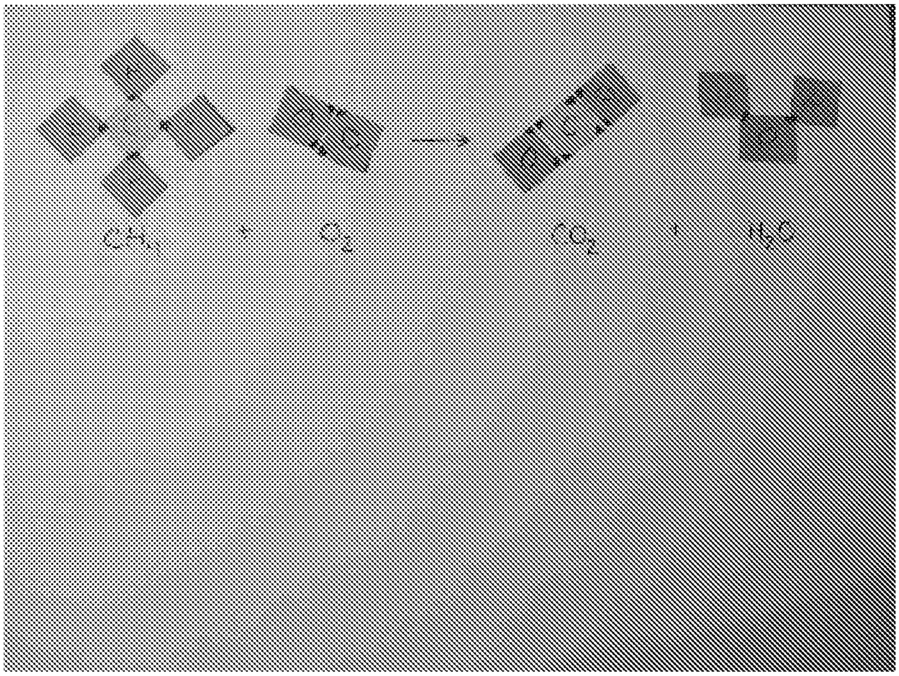
FIGS. 13A and 13B show a chemical formula balance showing a sample formula according to the invention.
Figure 13B:
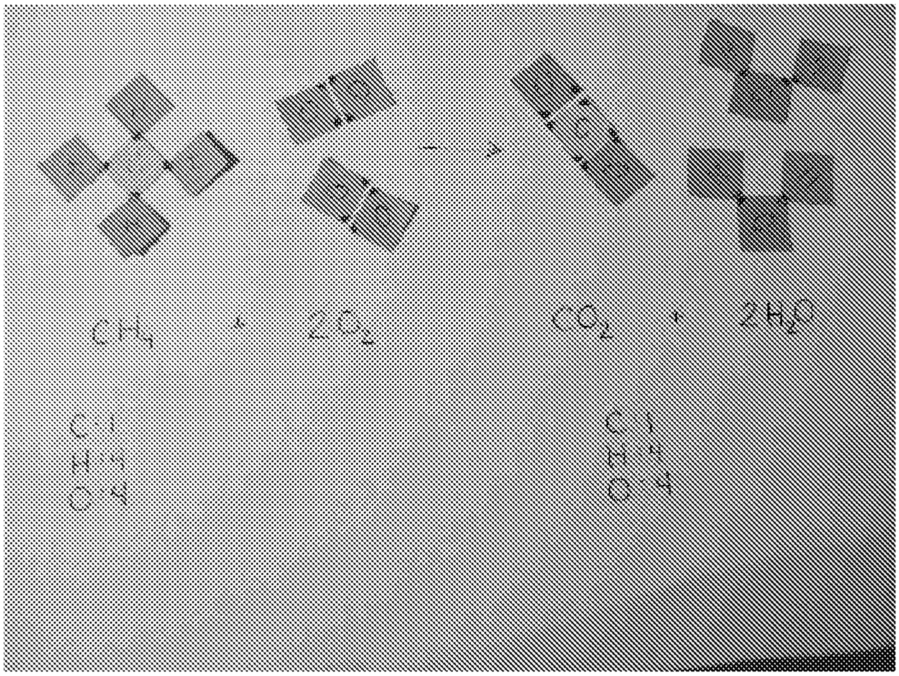

FIGS. 13A and 13B show a chemical formula balance showing a sample formula according to the invention. In this example of FIG. 13A the formula:

$$CH_4 + O_2 \longrightarrow CO_2 + H_2O$$

while FIG. 13B shows the formula:

$$CH_4 + 2O_2 \longrightarrow CO_2 + 2H_2O.$$

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. An educational apparatus, comprising:

a Roberval-style balance, comprising:

an indicator for providing feedback to a user, with which the user determines whether they have created an equality or inequality and whether an adjustment is needed, wherein said indicator comprises a pointer having clearly marked inequalities, wherein users connect mathematical statements easily and accurately with a correct inequality symbol, and wherein said indicator provides users with a physical representation of basic math operations, including addition, subtraction, multiplication, and division, as well as fractions, negative numbers, and algebraic equations;

sliding adjusters for zeroing the balance on an uneven surface or when masses in a provided equation are slightly unequal;

left and right removable pans for efficient storage;

a rear counterweight suspended below a top balance arm as a counterbalance offset to increase responsiveness and accuracy of balance;

a plurality of constant cubes comprising several different sets of unit weight;

a plurality of cubes or objects labeled with colored symbols, in a variety of weights and quantities;

a plurality of opposite chips comprising small cards labeled with negative signs and of negligible mass so they do not disrupt the balance; and a plurality of line chips comprising small cards of negligible mass labeled with "x" and "y" to allow users to explore linear and simple quadratic relationships;

wherein combinations of said constant cubes, cubes or objects labeled with colored symbols, opposite chips, and line chips are arranged on said removable pans to teach mathematical functions.

2. The apparatus of claim 1, further comprising:

a plurality of components including:

½ fractional pieces;

⅓ fractional pieces;

¼ fractional pieces; and

"−1" (Minus 1) pieces with removable constant cube, and "−1" indicator in the bottom of a well, formed therein;

wherein said components are configured to be taken apart and reassembled.

3. The apparatus of claim 1, further comprising:

a plurality of variable-naught pieces comprising thin, ultralight colored letters which have minimal mass so as to not deflect the balance indicator even when several are added to one side together and therefore can simulate a variable which equals zero.

4. The apparatus of claim 1, further comprising:

a fraction set comprising:

multiple squares of uniform area and mass sliced into a variety of fractional pieces with which users explore concepts of adding and subtracting fractions with like and unlike denominators;

wherein users create equivalent fractions to practice renaming and reducing fractions for convenient computations and then test their results on the balance, using feedback from the indicator to verify results or realize a need for correction or recalculation;

wherein users predict a sum of fractions and test the result on the balance, using the indicator to verify their results; and wherein users explore fractional inequalities using the balance indicator to verify results.

5. The apparatus of claim 1, further comprising:

a plurality of cubes labelled with numbers to indicate a correct mass with which users check solutions kinesthetically and explore substitution by replacing an identified variable with a number cube.

6. The apparatus of claim 1, in which an addition function is performed by:

providing weighted, color-coded letter cubes corresponding to questions posed in the form of algebraic equations and inequalities;

placing all items on a left side of the equation onto a left balance pan and placing all items on a right side of the equation on a right balance pan;

checking for balance by making sure the balance indicator points to an equal sign, and by adjusting the sliders as needed;

performing subtraction to remove any addend from a variable quantity and noting that the balance is uneven;

using subtraction to remove an identical quantity from the side opposite the variable to create a balanced equation; and identifying a value of an unknown variable by counting constant cubes, wherein each constant cube has a mass of one unit.

7. The apparatus of claim 1, further comprising:

a minus variable cube comprising a well that is formed therein and that is adapted to hold a plurality of removable unit weights covering negative values, said minus variable cube comprising a complete variable, said minus variable cube comprising notations that are revealed in a bottom of the well when weight units are removed therefrom; and one or more unit weights are removable to carry out a mathematical operation of subtracting one or more units from the variable;

wherein the user places a variable on the balance pan and then performs subtraction operation by removing one or more weight cubes from a top of the variable;

wherein once an entire mathematical statement is demonstrated on the balance with a variable having a subtracted value on the left side and a numeric value on the right side the user can then intuitively see that a value must be added to the left side to obtain a whole variable; and wherein the balance indicates an inequality and the user is prompted to duplicate the action of adding a value to the right side of the balance to see the value of the variable.

8. The apparatus of claim 7, further comprising:

one or more minus variables for subtracting units from a single variable to provide additional complexity and challenge along with the intuitive action of removing weight units to simulate the subtraction operation;

wherein a mathematical operation of subtraction is represented via physical characteristics of the cube itself rather than with the mechanics of the balance; and wherein users emulate subtraction by subtracting values from the variable rather than adding values to a specific negative portion of the balance.

9. The apparatus of claim 1, further comprising:

fractional cubes for several variables that are adapted to be divided into any of halves, thirds, and fourths by sliding apart.

10. The apparatus of claim 1, in which a multiplication function is performed by:

placing a correct number of color-coded variable on one side of the balance;

completing equations using a correct number of unit cubes on the other side of the balance;

wherein the balance displays a strategic advantage of dividing the variables into smaller groups; and wherein the balance displays the relationship between similarly divided groups of unit cubes to match with the groups of variables; and identifying a value of the variable and checking for consistency and accuracy.

11. The apparatus of claim 1, in which functions involving fractions are performed by:

providing a plurality of fractional cubes for several variables which can be divided into any of halves, thirds, and fourths by sliding apart, wherein said fractional variables allow users to solve questions involving division or multiplication by a fraction;

wherein users can intuitively see that they can reach a solution by multiplying a fraction to reach a whole number; and providing feedback from the balance to indicates that the user must perform identical multiplication on the side opposite the variable to determine the solution.

12. The apparatus of claim 1, in which functions involving negative numbers are performed by:

providing negative signs in the form of opposite chips which comprise lightweight tabs imprinted with negative signs.

13. The apparatus of claim 1, further comprising:

opposite cards comprising lightweight cards that are imprinted with a negative sign to denote the opposite;

wherein opposite cards allow a user to visualize values of variables which have a negative value and allow the user to visualize taking an opposite, or additive inverse, of both sides of a mathematical statement.

14. The apparatus of claim 1, further comprising:

naught variables having a weight that is under a sensitivity threshold of the balance;

wherein naught variables allow a user to conceptualize a variable that has a value of zero.

15. The apparatus of claim 1, further comprising:

shape cubes.

16. The apparatus of claim 1, further comprising:

a plurality of pieces include chemical symbol and magnetic, snap-and-lock, hook-and-loop, or similar attachment points corresponding to the element's most common number of chemical bonds;

wherein pieces for various elements have masses, and are marked accordingly, which are proportional to their average atomic masses to demonstrate the reality of increasing atomic mass for atoms of increasing atomic number across each period and permit exploration of basic stoichiometry;

wherein pieces corresponding to elements in each column/group are sized incrementally to show user the increase in atomic radius as they move down the periodic table;

wherein users create compounds to demonstrate a variety of chemical reactions;

wherein users can then intuit a relationship between subscripts and number of atoms present as well as coefficients and number of molecules/formula units present;

wherein users can then readily see unbalanced chemical equations and take steps to balance the equation they have created by making sure the same number of atoms of each element are present on both sides of the balance; and wherein the balance "=" indicator helps users verify that an equation is balanced.

17. The apparatus of claim 16, further comprising:

a plurality of additional pieces for visualizing the basics of stoichiometry, comprising:

mole holes comprising lightweight cups into which the pieces of a compound can be placed to conceptualize molar mass;

colored mole holes comprising colors that allow users to differentiate between individual reactants and products and readily see the number of moles of each substance present in the balanced equation; and multiplier place cards, wherein once an appropriate multiplier for the known mass is determined from a relationship between a given mass and a molar mass of a substance, a multiplier place card is placed in easy sight or on the center of the balance so that user can conceptualize this multiplier being applied to every substance in the equation.

* * * * *